(12) United States Patent
Roy et al.

(10) Patent No.: US 7,711,978 B1
(45) Date of Patent: May 4, 2010

(54) PROACTIVE UTILIZATION OF FABRIC EVENTS IN A NETWORK VIRTUALIZATION ENVIRONMENT

(75) Inventors: Subhojit Roy, Pune (IN); Niranjan Pendharkar, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 1122 days.

(21) Appl. No.: 11/027,535

(22) Filed: Dec. 30, 2004

(51) Int. Cl.
*G06F 11/00* (2006.01)

(52) U.S. Cl. .................. 714/4; 714/5; 714/6; 714/7; 714/43

(58) Field of Classification Search .............. 714/4, 714/5, 6, 7, 8, 42, 43
See application file for complete search history.

(56) References Cited

U.S. PATENT DOCUMENTS

| | | | |
|---|---|---|---|
| 6,021,507 A * | 2/2000 | Chen ..................... | 714/4 |
| 6,415,292 B1 | 7/2002 | Kamvysselis | |
| 6,609,213 B1 | 8/2003 | Nguyen et al. | |
| 6,658,590 B1 | 12/2003 | Sicola et al. | |
| 6,671,820 B1 | 12/2003 | Kelman | |
| 6,684,266 B2 | 1/2004 | Faber et al. | |
| 6,704,812 B2 * | 3/2004 | Bakke et al. ............. | 714/4 |
| 6,772,290 B1 | 8/2004 | Bromley et al. | |
| 6,772,308 B1 | 8/2004 | Ohr | |
| 6,772,309 B1 | 8/2004 | Ohr et al. | |
| 7,043,663 B1 * | 5/2006 | Pittelkow et al. ........ | 714/4 |
| 7,080,221 B1 * | 7/2006 | Todd et al. ............. | 714/6 |
| 7,203,732 B2 * | 4/2007 | McCabe et al. ......... | 714/4 |
| 7,260,739 B2 * | 8/2007 | Burton et al. ........... | 714/6 |
| 7,290,168 B1 * | 10/2007 | DeKoning ............... | 714/6 |
| 7,307,948 B2 * | 12/2007 | Infante et al. ........... | 714/4 |
| 2002/0166079 A1 * | 11/2002 | Ulrich et al. ............ | 714/6 |
| 2002/0194294 A1 * | 12/2002 | Blumenau et al. ........ | 709/213 |
| 2002/0194524 A1 | 12/2002 | Wiley et al. | |
| 2003/0018927 A1 * | 1/2003 | Gadir et al. ............. | 714/4 |
| 2003/0112746 A1 * | 6/2003 | Schaller et al. .......... | 370/216 |
| 2004/0073675 A1 | 4/2004 | Honma et al. | |
| 2004/0073676 A1 | 4/2004 | Honma et al. | |
| 2004/0073677 A1 | 4/2004 | Honma et al. | |

(Continued)

OTHER PUBLICATIONS

Randal Burns, "Fastpath Optimizations for Cluster Recovery in Shared-Disk Systems," Proceedings of the 2004 ACM/IEEE Conference on Supercomputing SC '04, 9 pages.

*Primary Examiner*—Robert Beausoliel
*Assistant Examiner*—Joseph D Manoskey
(74) *Attorney, Agent, or Firm*—Robert C Kowert; Meyertons, Hood, Kivlin, Kowert & Goetzel, P.C.

(57) ABSTRACT

Network fabric events may be utilized to proactively handle network path outages. A storage network virtualization manager may receive a network fabric event indicating a failure along a network path to a storage device and in response may initiate a proactive error handling mechanism. A storage network virtualization manager may proactively handle a network path failure before I/O requests via that network path fail. The proactive error handling mechanism may be initiated and completed prior to or without a host receiving an indication that an access request to a storage device on the network path has failed. Proactive error handling in response to network fabric events may reduce the number of I/O failures and retries and may also reduce the length of time access requests to storage devices affected by a network fabric path failure must be quiesced.

20 Claims, 9 Drawing Sheets

U.S. PATENT DOCUMENTS

2004/0153841 A1 8/2004 Beck
2004/0210656 A1 10/2004 Beck et al.
2005/0262309 A1 11/2005 Frey et al.
2006/0129759 A1 6/2006 Bartlett et al.

* cited by examiner

PROACTIVE UTILIZATION OF FABRIC EVENTS IN A NETWORK VIRTUALIZATION ENVIRONMENT

BACKGROUND OF THE INVENTION

1. Field of the Invention

This invention relates to data storage and data storage network/fabrics in general and, more particularly, to proactive utilization of fabric events in a network virtualization environment.

2. Description of the Related Art

Maintaining continual access to large amounts of data is a primary concern of many business operations and the need for data storage capacity in enterprise systems is growing exponentially. Modern network storage systems provide the ability to store data on multiple, often redundant storage devices or subsystems. Data stored across multiple devices or subsystems are often virtualized to present a single, uniform arrangement of data to applications. Maintaining continual access to the data of a storage network requires quick, efficient detection and correction of network errors such as failures along network fabric paths to storage devices.

Detecting and handling network fabric path failures within a storage network may take a relatively long time and may cause access request failures. Traditionally, detecting network path failures has involved a host detecting that a host-initiated I/O failed, generally by timing-out before the I/O request was completed. Only after an I/O request failed or timed out, and generally after a number of retries, would the underlying error be looked into and dealt with.

SUMMARY

In a network virtualization environment where multiple hosts access a virtualized storage system, network fabric events may be utilized to proactively handle network path outages. A storage network virtualization manager may be configured to present a logical, aggregated, representation of data stored on one or more storage devices in a network fabric, such as a SAN fabric. Such a storage network virtualization manager may receive a network fabric event indicating a failure along a network path to a storage device and may in response initiate a proactive error handling mechanism. Rather than detecting network fabric path errors only after an I/O to a storage device has failed or timed out at a host, a storage network virtualization manager may receive a network fabric event, such as a state change notification, regarding a network fabric path failure and proactively handle the error before I/O requests via that network path fail. The proactive error handling mechanism may be initiated prior to or without a host receiving an indication that an access request to a storage device on the network path has failed. In other words, by initiating the proactive error handling mechanism in response to a network fabric event, the storage network virtualization manager may be able to handle a network path failure before the failure of any I/O requests for storage devices on the relevant network path.

The storage network virtualization manager and the proactive error handling mechanism may handle the network path failure in different ways in different embodiments. For instance, in one embodiment, the proactive error handling mechanism may determine and apply an alternate path to storage devices on the failed network path. In another embodiment, the proactive error handling mechanism may configure a spare storage device in place of storage devices on the failed network path. In yet other embodiments, the storage network virtualization manager may manage the mirroring of a plurality of mirrored storage devices and a network path failure may prevent access to one of the mirrored storage devices. In such embodiments, the proactive error handling mechanism may detach the inaccessible mirrored storage device and may, in some embodiments, configure an additional mirrored storage device in place of the detached device.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
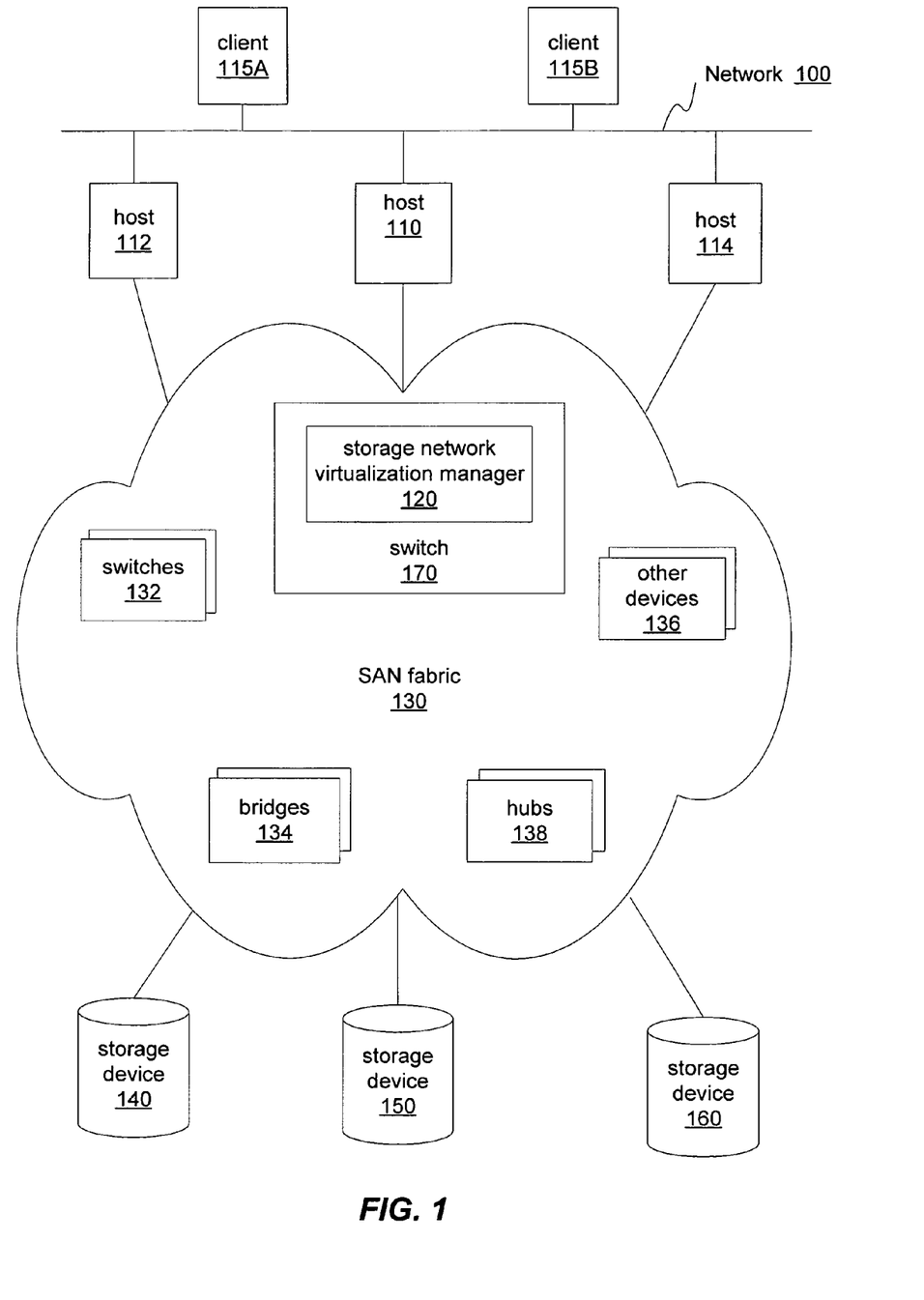
FIG. 1 is a block diagram illustrating, according to one embodiment, a storage network virtualization manager on a network fabric device capable of proactively utilizing network fabric events, as described herein.

FIG. 1 is a block diagram illustrating, according to one embodiment, a storage network virtualization manager on a network fabric device capable of proactively utilizing network fabric events, as described herein. In response to receiving a network fabric event indicated a failure along a network fabric path to a storage device, a storage network virtualization manager may initiate a proactive error handling mechanism, according to various embodiments. In some embodiments, the proactive error handling mechanism may detect and apply an alternate path through the network fabric to the storage device. In other embodiments, the error handling mechanism may trigger an immediate detach of the affected storage device, mirror, or plex. By proactively initiating an error handling mechanism in response to receiving a network fabric event, the storage network virtualization manager may significantly reduce number of access requests to affected storage devices that fail and must be retried by application hosts and clients.

A storage network in a virtualized environment may utilize a network fabric, such as SAN fabric 130 illustrated in FIG. 1. In some embodiments, a storage network virtualization manager 120 may reside on a network fabric devices, such as switch 170, bridges 134, hubs 138, or other devices 136. Storage network virtualization manager 120 may manage the storage of data on storage devices 140, 150 and 160, accessible via SAN fabric 130. Host devices, such as hosts 110, 112, and 114, may issue access requests for data stored on the storage network via storage network virtualization manager 120 and on behalf of clients 115 on network 100. In some embodiments, clients 115 may be directly connected to SAN fabric 130. A network path failure in SAN fabric 130 may be handled by storage network virtualization manager 120 in response to receiving a network fabric event, according to some embodiment. A network fabric event is a fabric-level event generated by a fabric device, such as switch 170 (as opposed to a host, client or storage device). A fabric event may pertain to the fabric itself, as opposed to any particular host or storage device operation being conducted via the fabric. In one embodiment, logic, or software, on a fabric device, such as switch 170, may report a network path failure through a network fabric event to storage network virtualization manager 120. For example, in one embodiment, a state change notification (SCN) event may be reported by logic on a network fabric device to storage network virtualization manager 120 and storage network virtualization manager 120 may initiate a proactive error handling mechanism in response. In one embodiment, fabric logic on switch 170 may report the fabric event to storage network virtualization manager 120, while in other embodiments, logic on another fabric device, such as a bridge 134, or a hub 138, may report network fabric events.

Network fabric events may be issued by logic on network fabric devices in the storage network. For example, a network fabric virtualization system may include logic to monitor and detect changes in the state of the network fabric, in some embodiments. Thus, the network fabric system may be able to detect a change, such as a network path failure, or the addition and detection of devices, such a storage devices, according to various embodiments.

In one embodiment, a network fabric, such SAN fabric 130 may include logic to implement an API or other mechanism for reporting network fabric events. For example, in one embodiment, such a network fabric API may implement a callback mechanism allowing a storage network virtualization manager to receive state change notification, or other network fabric events.

A SAN may include a number of SAN fabric components, such as switches, hubs, bridges, or other devices, that perform various functions within the SAN system and depending on the number of host/servers and storage devices that the SAN will interface. For example, hub 138 may perform a repeater function, which is to amplify and/or regenerate a received signal and provide it at multiple outputs. A hub takes the data that comes into one port and sends it out all other ports that are included in the hub. It doesn't usually perform any filtering or redirection of data. Bridges 134 are useful for joining networks made of different media types or protocols together into larger networks, and keeping network segments free of data that doesn't belong in a particular segment. Bridges 134 may join networks or network segments, which use different protocols. In such cases, the bridge may perform lower layer translation on the packets that it transfers from one network to another. In some embodiments, the SAN may include only a subset of the types of SAN fabric components illustrated in FIG. 1.

SAN fabric 130 may also include a storage network virtualization manager 120. In some embodiments a storage network virtualization manager may be implemented as a stand-alone component separate from the other components of SAN fabric 130, but in other embodiments, the storage network virtualization manager may be implemented as a part of one of the other components of the SAN fabric. In general, a storage network virtualization manager may be located anywhere within the SAN fabric, within any of the components previously described, including a host device.

One or more end-user platforms (clients 115) may access the SAN, typically via a LAN or WAN connection to one or more of the hosts 120 to access data stored on storage devices 140, 150, and 160. In some embodiments, clients 115 may directly access the SAN. Storage devices 140, 150, and 160 may include one or more of, but are not limited to, RAID (Redundant Array of Independent Disks) systems, disk arrays, JBODs (Just a Bunch Of Disks, used to refer to disks that are not configured according to RAID), tape devices, and optical storage devices. Normally, an enterprise's data may be stored on disk drive type storage devices to provide fast access time. Generally, clients of a file system access data through a host or file server of the file system. Host/servers 110, 112, and 114 may be any of various types of devices, including, but not limited to, personal computer systems, desktop computers, laptop or notebook computers, mainframe computer systems, workstations, network appliances, network computers, Internet appliances, or other suitable devices. Host system 110 may include at least one processor. The processor may be coupled to memory. Memory is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

SANs and other storage network systems capable of proactively utilizing network fabric events may be implemented using a wide variety of technologies. The SAN mix can include Enterprise Systems Connection (ESCON), Fiber Distributed Data Interface (FDDI), Asynchronous Transfer Mode (ATM), IBM's Serial Storage Architecture (SSA), and Fibre Channel. SAN architectures may also implement a number of underlying protocols, including TCP/IP and variants of SCSI (Small Computer System Interface). The most popular implementation of SAN for open systems is based on SCSI over Fibre channel. Fibre Channel Protocol (FCP) specifies how to run the SCSI command set over a dedicated Fibre Channel optical fabric. In direct server attached storage, a local SCSI controller on a peripheral bus fulfills a data request initiated by a SCSI driver in the host server. On a SAN, a Fibre Channel host bus adapter (HBA) may replace the SCSI controller in each server 120 to connect to the SAN fabric 130, which in turn may connect to disk arrays, tape drives, and other storage devices.

A LUN (logical unit number) is the SCSI identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk typically has a single logical unit. Tape devices and array controllers may incorporate multiple logical units to which I/O commands may be addressed. Each logical unit exported by an array controller may correspond to a virtual disk. SAN fabric 130 may be implemented, for example, in accordance with the Fibre Channel Switch Fabric-2 (FC-SW2) open standard specification to provide redundancy and ensure high data availability. SANs may be deployed in both homogeneous and heterogeneous environments. In a heterogeneous environment, a SAN may allow different kinds of servers, e.g. Windows NT, UNIX, Linux, Netware, and OS/390, to share different kinds of storage, e.g. disk, tape, and redundant arrays of inexpensive disks (RAID). With this shared capacity, organizations may be able to acquire, deploy, and use storage devices more cost-effectively.

Network 100, as illustrated in FIG. 1, may comprise any of various network technologies, according to various embodiments. Network 100 may be a local area network, wide area network, intranet network, Internet network, or many other types of network. Network 100 may be designed to be continuously available (although network outages may occur), or may be intermittent (e.g. a modem connection made between a computer system in a user's home and a computer system in a user's workplace). Network 100 may utilize any of a number of different physical networking technologies including, but not limited to, Fiber Channel, Ethernet, Fast-Ethernet, Gigabit-Ethernet, Myrinet, Infiniband, VAX CI, or Server-Net, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies. Additionally, Network 100 may comprise shared storage or shared memory for communicating between different computer systems or between processes within the same computer system, according to some embodiments. In some embodiments, Network 100 may be the interconnect network for any of various distributed shared storage environments, including, but not limited to, network file system (NFS), common Internet file system (CIFS), storage area network (SAN), network attached storage (NAS), storage-network aggregation, multi-site block storage, object-based storage devices (OBSD), or other asymmetric, out-of-band, or shared storage models.

A storage device, such as storage device 140, 150, or 160, may be any type of networkable computing device capable of communicating with and providing data storage services to other devices or processes in a distributed shared storage environment. According to various embodiments, storage devices 140, 150, and 160, may be configured to implement any of numerous data storage models including but not limited to, storage-network attach, storage-network aggregation (SNA), network attached storage (NAS), storage area network (SAN), Redundant Array of Independent (or Inexpensive) Disks (RAID), or as object-based storage devices (OBSDs). In certain embodiments, storage devices may be configured to implement a combination of different data storage models. Storage devices may utilize one or more of numerous types of storage media including but not limited to Hard disk storage, floppy disk storage, removable disk storage, flash memory and random access memory (RAM) are examples of storage media. The terms "storage" and "storage medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The storage medium may include other types of storage as well, or combinations thereof.

The specific configuration of devices illustrated in FIG. 1 is just one of various configurations on which network fabric events may be proactively utilized. FIG. 1 illustrates an exemplary SAN system capable of proactively utilizing network fabric events, according to one embodiment. A SAN system is just one of numerous possible embodiments of storage and file systems capable of proactively utilizing network fabric events as described herein. A SAN may be a high-speed network that enables fast, reliable access among host/servers 110, 112, and 114 and storage devices 140, 150, and 160. A SAN may be used to connect servers to storage devices, servers to each other, and storage devices to other storage devices through combinations of hubs 138, switches 132, bridges 134, and/or other devices 136 collectively referred to as a SAN Fabric 130.

As will be described in more detail below, a storage network virtualization manager, such as storage network virtualization manager 120 may be configured to receive a network fabric event and in response, initiate a proactive error handling mechanism.

Figure 2:
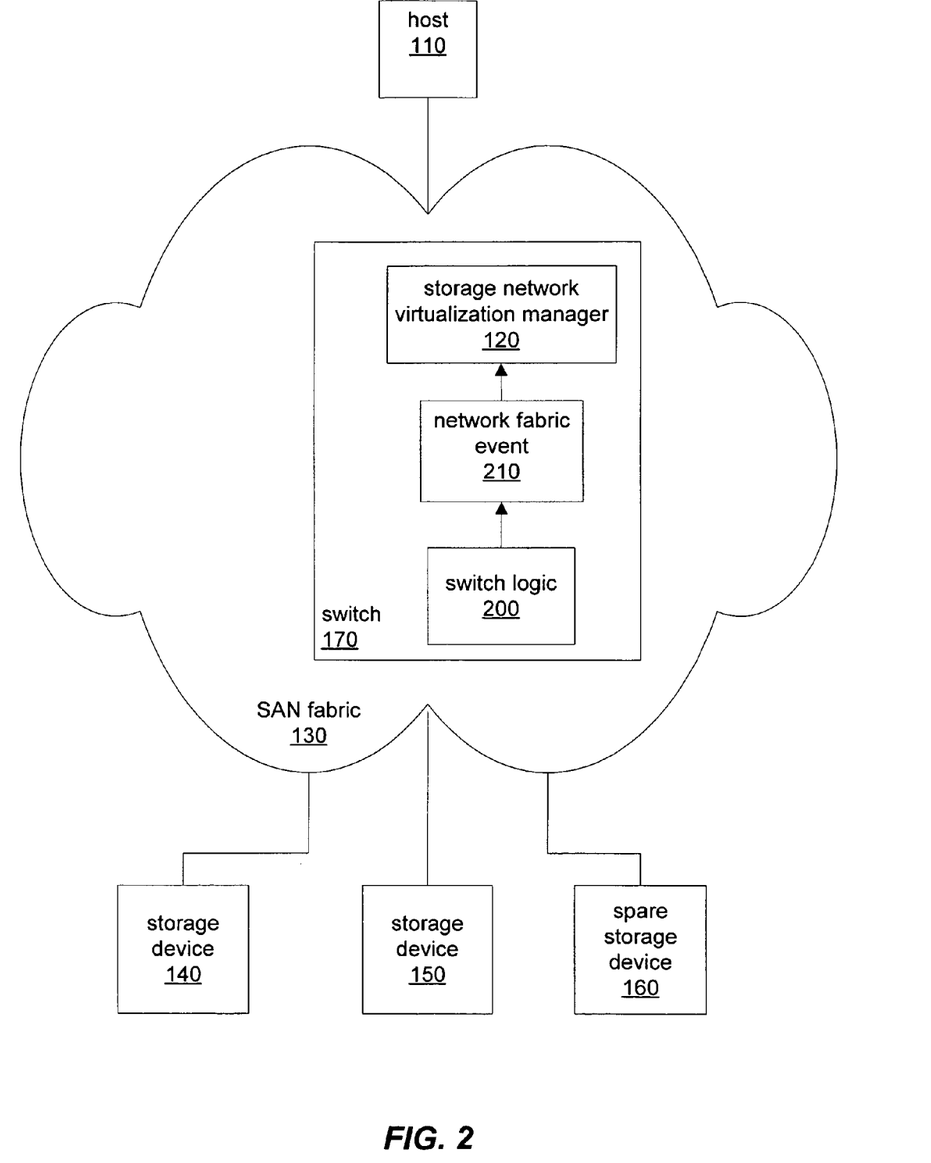
FIG. 2 is a block diagram illustrating a storage network virtualization manager receiving a network fabric event, according to one embodiment.

FIG. 2 is a block diagram illustrating a storage network virtualization manager receiving a network fabric event, according to one embodiment. Switch 170 may be configured to monitor SAN fabric 130 and issue network fabric events in response to detecting certain conditions. For example, in one embodiment, switch logic 200 on switch 170 may detect a change in the state of SAN fabric 130 and may report the detected change in a network fabric event. In one embodiment, switch logic 200 may send network fabric event 210 to storage network virtualization manager 120, as illustrated in FIG. 2. For instance, in one embodiment, switch logic 200 may detect a change in state in SAN fabric 130 corresponding to a network path failure to storage device 140, for example. Switch logic 200 may then issue network fabric event 210. In some embodiments, switch logic 200 may implement a callback mechanism allowing storage network virtualization manager 120 to register or otherwise request to be notified regarding network fabric events and to supply a callback function for that purpose. In response to receiving network fabric event 210, storage network virtualization manager 120 may initiate a proactive error handling mechanism. For example, in one embodiment, storage device 150 may become inaccessible via SAN fabric 130. For instance, a network cable may fail or come uncoupled from storage device 150. Switch logic 200 may detect a state change in SAN fabric 130 corresponding to the inaccessibility of storage device 150 and may issue network fabric event 210 in response. For example, in one embodiment switch logic 200 may communicate with storage network virtualization manager 120 via a call back function, configured previously. The setup and use of inter-process or inter-device, communication, such as via callback functions is well understood and will not be described in detail herein. While FIG. 2 illustrates an embodiment where switch logic 200 and storage network virtualization manager 120 execute on the same physical device, namely switch 170, in other embodiments, switch logic 200 may reside and execute on a device separate from storage network virtualization manager 120. In general switch logic 200 may reside and execute on any device within SAN fabric 130.

Storage network virtualization manager 120 may receive network fabric event 210 and in response may initiate a proactive error handling mechanism. For example, in one embodiment, storage network virtualization manager 120 may be able to determine that storage device 150 is not accessible. In one embodiment, this information may be included in network fabric event 210, while in other embodiments, storage network virtualization manager 120 may be configured to request or determine the exact nature of the condition that caused network fabric event 210 to be issued by interrogating another process or device in SAN fabric 130, such as switch logic 200. In other embodiment, storage network virtualization manager 120 may initiate a proactive error handling mechanism that may rely on the error handling mechanism determine the exact nature of the network condition that caused network fabric event 210 to be issued. Such an error handling mechanism may be a part of storage network virtualization manager 120, or may reside in another process on switch 170 or another device in SAN fabric 130. In one embodiment, storage network virtualization manager 120 may forward network fabric event 210 to another virtualization manager for handling, as will be described in more detail below.

In response to receiving network fabric event 210, storage network virtualization manager 120 may initiate a proactive error handling mechanism, as described herein. The error handling mechanism may perform any of a number of operations to correct or respond to the underlying network fabric condition that resulting in network fabric event 210. For example, in one embodiment, the error handling mechanism may configure a spare storage device, such as spare storage device 160 in place of an inaccessible storage device. For example, SAN fabric 130 may be configured to maintain one or more spare storage devices, such as spare storage device 160. In one embodiment, for instance, SAN fabric 130 may implement a storage system utilizing redundant storage, such as a mirrored or RAID configured storage system that includes one or more alternate storage devices, such as spare storage device 160. In such an example, storage network virtualization manager 120 may initiate a proactive error handling mechanism that may, in one embodiment, configure spare storage device 160 in place of storage device 140.

The exact tasks required to configure a spare storage device may vary from embodiment to embodiment. For example, in one embodiment, SAN fabric 130 may include a RAID configured storage system and in response to a network fabric event regarding the inaccessibility of storage device 140, a proactive error handling mechanism may configure the RAID system to use spare storage device 160 in place of inaccessible storage device 140 and may utilize redundancy data to configure spare storage device 160. In another example, SAN fabric 130 may be configured to maintain spare storage device 160 as an actively mirrored copy of storage device 140 and in response to network fabric event 210, storage network virtualization manager 120 may initiate a proactive error handling mechanism that may configure SAN fabric to utilize spare storage device 160 in place of inaccessible storage device 140.

By initiating a proactive error handling mechanism in response to a network fabric event storage network virtualization manager 120 may prevent failure or timeout of I/O requests issued by hosts or clients, such as host 110, in some embodiments. In some embodiments, the error handling mechanism initiated by storage network virtualization manager 120 may be able to complete a fabric path switch to an alternate fabric path or may be able to detach the affected storage device(s) before host 110 issues any I/O requests to the affected storage devices. Detecting and handling a network path failure before host 110 issues any I/O requests for the affected storage device may be especially important when the storage network includes switch or virtualization devices that do not utilize a "store and forward" technique for I/O requests. A "store and forward" type switch or virtualization device stores the data for an I/O request in some form, before translating the request to reach the actual physical storage device. Therefore, in the case of a failure to the storage device, the "store and forward" device may retry the I/O on its own without the knowledge of the host that issued the I/O. However, devices that do not use "store and forward" cannot retry the I/O request on their own because the data for the I/O request may not be available to the device after the I/O request has failed. For example, if a storage network device does not use store and forward, any failed, or timed-out, I/O request is typically retried by the host or client that issued it, in order to recover from the path failure error. Thus, in some embodiments, proactively handling a network fabric path failure in response to a network fabric event may significantly reduce the number of I/O request retires required by hosts and clients.

Additionally, by responding to network fabric events, storage network virtualization manager 120 may initiate an error handling mechanism sooner than detecting a network fabric path failure through a failed or timed out I/O request. If a path switch was not triggered until after the I/O request failed or timed out, a retry of the I/O request from the host would have to be delayed until the path switch was completed. This may be important in certain embodiments that include active/passive disk arrays where the amount of time to switch to an alternate network fabric path may be significant.

Figure 3:
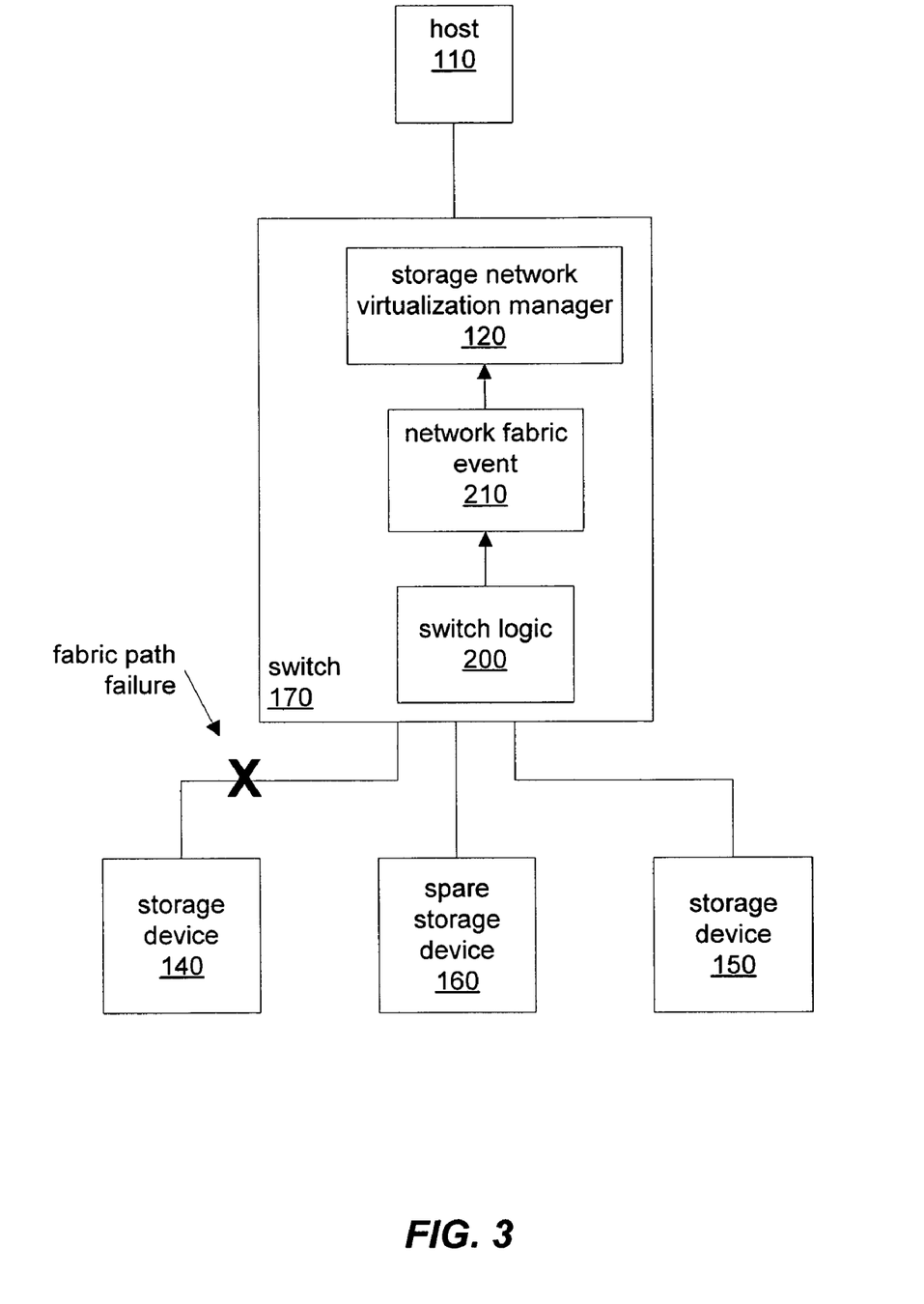
FIG. 3 is a block diagram illustrating a storage network virtualization manager proactively handling a fabric failure in response to receiving a network fabric event, in one embodiment.

FIG. 3 is a block diagram illustrating a storage network virtualization manager proactively handling a fabric failure in response to receiving a network fabric event, in one embodiment. In one embodiment, for example, a failure in a network fabric path may prevent access to storage device 140. For instance, a network cable may become uncoupled, or may physically fail. Alternatively, a network fabric device, such as hub or bridge may fail preventing access to storage device 140, in another example. In yet another example, a system administrator may temporarily or permanently remove storage device 140 from the network fabric for some reason. Regardless of the exact reason that storage device 140 becomes inaccessible, switch logic 200 may detect the change in the network fabric and may, issue network fabric event 210 to storage network virtualization manager 120, according to some embodiments.

Storage network virtualization manager 120 may be notified of network fabric event 210 in various ways, according to different embodiments. In one embodiment switch logic 200 may utilize a callback function in storage network virtualization manager 120. For example, storage network virtualization manager 120 may have registered with switch logic 200 via a network fabric API to receive network fabric events and may have supplied the address of a callback function for receiving those events. In another example, switch logic 200 may send either a directed or broadcast network message regarding network fabric event 210. In general, network fabric events may be communicated via any of a number of well known and well understood inter-process communication techniques.

In some embodiments, storage network virtualization manager 120 may initiate a proactive error handling mechanism in response to receiving network fabric event 210. In one embodiment, storage device 140 may represent a mirrored storage device and an initiated error handling mechanism may instruct the network fabric, or a storage subsystem manager in the network fabric, to detach storage device 140 from the mirrored storage system, thereby allowing the storage network to proactively respond to access requests for storage device rather than having to wait for such a request to timeout.

In another embodiment, an error handling mechanism initiated by storage network virtualization manager 120 may configure the storage network to use spare storage device 160 in place of inaccessible storage device 140. According to some embodiment, proactively handling an error condition in response to receiving a network fabric event may prevent, or reduce the chances of, an access request to storage device 140 failing. For instance, proactively replacing storage device 140 with spare storage device 160, accessible via a different network path than storage device 140, may prevent the failure of an I/O request for data on storage device 140, according to certain embodiments. Similarly, proactively performing a network fabric path switch to an alternate path to storage device 140 may also reduce or prevent altogether the failing of access requests to storage device 140.

In some embodiments, to maintain data consistency while handling a failure, storage network virtualization manager 120 may quiesce, or silence, I/O requests for some or all of the storage devices on the storage network before initiating a proactive error handling mechanism. The total amount of time that I/O requests need to be quiesced may be reduced by proactively initiating an error handling mechanism in response to receiving a network fabric event, in some embodiments. Thus, by proactively utilizing network fabric events to discover and handle network fabric path failures, a storage network virtualization manager may reduce the total amount of time I/O requests must be quiesced. Storage network virtualization manager 120 may quiesce I/O requests by buffering or holding the request or by instructing the requestor to retry the request, for example.

In other embodiments, a proactive error handling mechanism may be initiated and may complete without hosts or clients knowing of a problem with the network fabric. For example, in one embodiment, the proactive error handling mechanism may be able to perform a fabric path switch before any host or client issues an access request for any affected storage device. In other embodiments, storage network virtualization manager 120 may be configured to buffer any access requests that are issued while the proactive error handling mechanism is executing. In such an embodiment, the error handling mechanism may complete and storage network virtualization manager 120 may then issue any buffered access requests before any of them time out and thus before the issuing hosts or clients receive any indication of a problem in the storage network.

Additionally, in some embodiments, storage network virtualization manager 120 or a proactive error handling mechanism initiated by storage network virtualization manager 120 may be configured to perform batch error handling for multiple storage devices affected by the network fabric path failure. For example, in embodiments including large disk arrays, multiple storage devices may be bound together and by initiating batch error handling for every disk bound together on the failed network fabric path, significant time may be saved over the traditional method of waiting for the timing out of individual I/O requests to each respective storage device.

Proactively initiating an error handling mechanism in response to a network fabric event may, in some embodiments, prevent data corruption as well. For example, if a network administrator replaces one mirrored storage device with a new device without notifying the storage subsystem of the underlying replacement of a mirror copy and/or without shutting down or quiescing access to the mirrored storage system, access requests to the storage system may return garbage data from the newly added mirrored device before that device has been fully synchronized with the other storage devices in the storage network. In some embodiments, the removal of the mirrored storage device may be detected by switch logic 200 and, as described above, switch logic 200 may issue network fabric event 210 to storage network virtualization manager 120. In response to network fabric event 210, storage network virtualization manager 120 may initiate a proactive error handling mechanism that may, in some embodiments, detach the removed storage device from the mirrored storage system before any access request are issued. Additionally, in certain embodiments, the addition of the new storage device may be detected and a proactive error handling mechanism may be initiated that may synchronize, or cause to be synchronized, the added storage device prior.

Figure 4:
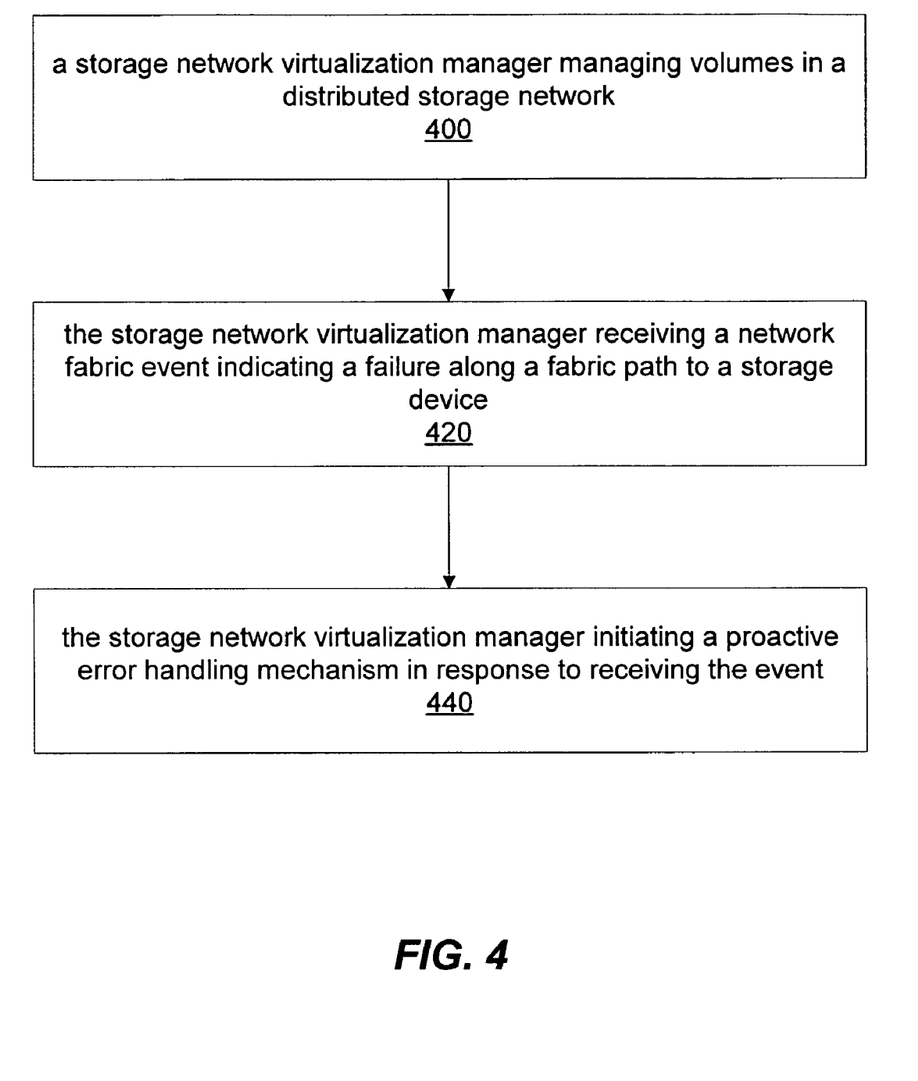
FIG. 4 is a flowchart illustrating one embodiment of a method for proactively utilizing network fabric events.

FIG. 4 is a flowchart illustrating one embodiment of a method for proactively utilizing network fabric events. As illustrated by block 400 a storage network virtualization manager may manage volumes in a distributed storage network. For example, as described above, storage network virtualization manager 120 may manage the virtualization of a network storage system, such as SAN fabric 130, illustrated in FIG. 1. The storage network virtualization manager may receive a network fabric event indicating a failure along a fabric path to a storage device, as illustrated by block 420. For example, in one embodiment, storage network virtualization manager 120 may receive network fabric event 210 from switch logic 200 regarding the inaccessibility of storage device 140, as illustrated in FIG. 3 and described above. According to one embodiment, the storage network virtualization manager may initiate a proactive error handling mechanism in response to receiving the network fabric event, as illustrated in FIG. 4. For example, storage network virtualization manager 120 may initiate a proactive error handling mechanism in response to receiving network fabric event 210 from switch logic 200, as described above regarding FIG. 3. In one embodiment, storage network virtualization manager 120 may initiate a proactive error handling mechanism that may instruct the storage network to use spare storage device 160, accessible via a different network fabric path, in place of inaccessible storage device 140, as described above.

In some embodiments, storage network virtualization manager 120 may instruct an error handling mechanism regarding how to correct or handle specific network conditions resulting in network fabric events. In other embodiments, however, storage network virtualization manager 120 may not have any knowledge of how a proactive error handling mechanism deals with any particular network fabric event and its underlying cause. Thus, the exact coordination between storage network virtualization manager 120 and an error handing mechanism initiated in response to a network fabric event may vary from embodiment to embodiment.

Please note that the specific steps described above represent only one of many possible arrangements of steps to implement the method illustrated by FIG. 4 and that other embodiments may include fewer or additional steps, or may perform the steps in a different order or a different manner than that described above. The specific embodiments described above regarding the method illustrated by FIG. 4 represent only exemplary embodiments and do not represent all possible embodiments.

Figure 5:
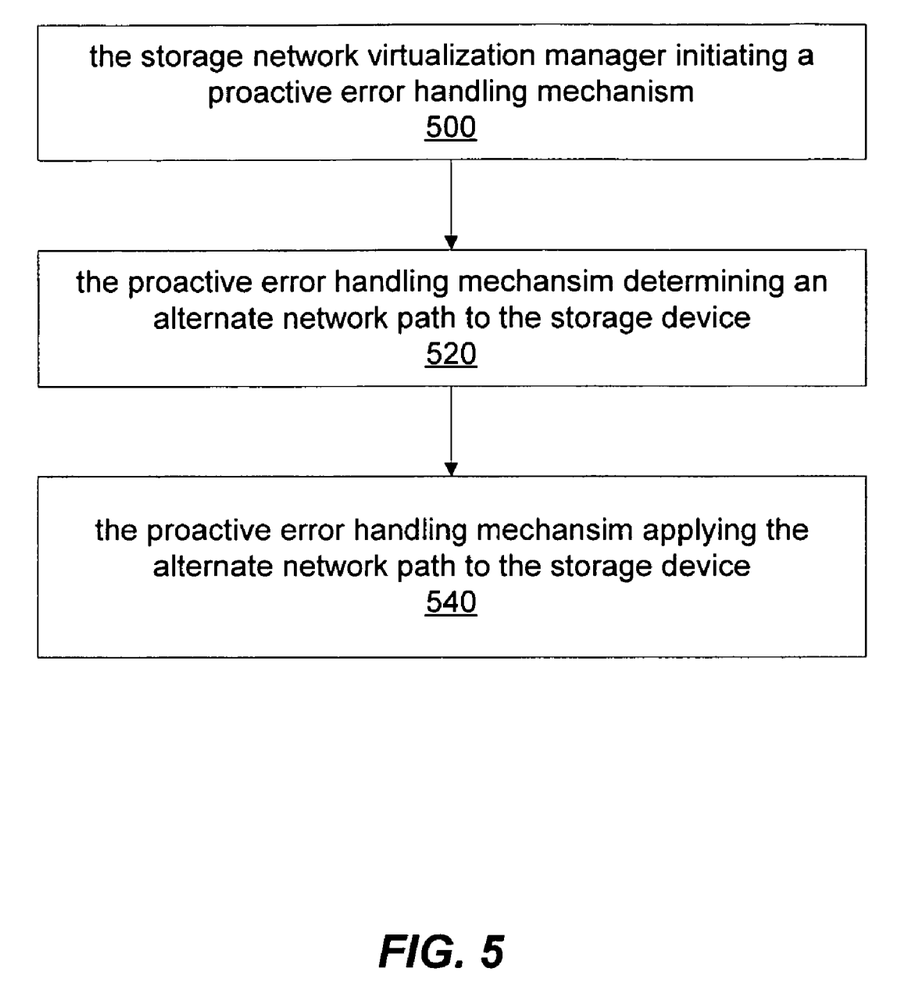
FIG. 5 is a flowchart illustrating one embodiment of a method for proactively utilizing network fabric events.

FIG. 5 is a flowchart illustrating one embodiment of a method for proactively utilizing network fabric events. According to some embodiments, a storage network virtualization manager may initiate a proactive error handling mechanism, as described above, and illustrated by block 500. For example, storage network virtualization manager 120 may initiate an error handling mechanism in response to network fabric event 210, in one embodiment. Network fabric event 210 may correspond to a storage device becoming inaccessible, such as storage device 140, illustrated in FIG. 3 and described above. As illustrated by block 520, the proactive error handling mechanism may determine an alternate network path to an inaccessible storage device, in one embodiment. For example, an error handling mechanism initiated by storage network virtualization manager 120 may determine an alternate network or fabric path to inaccessible storage device 140, according to one embodiment. The proactive error handling mechanism may apply, or instruct another process in SAN fabric 130 to apply, the alternate network path to the storage device, as illustrated by block 540, in one embodiment, thus rendering storage device 140 accessible again.

As described above, in a distributed storage environment, more than one path may exist to access any particular storage device or subsystem and when one path fails, the storage environment may be instructed or configured to use an alternate path to that storage device or subsystem. In some embodiments, the original network path may again become usable at a later time and another network fabric event may be issued corresponding to the available of devices via the original network fabric path. Thus, the storage environment may later be configured to use the original network path to the storage device, if it becomes usable again, in the same manner in which the alternate path was configured for use when the original path failed.

Please note that the specific steps described above represent only one of many possible arrangements of steps to implement the method illustrated by FIG. 5 and that other embodiments may include fewer or additional steps, or may perform the steps in a different order or a different manner than that described above. The specific embodiments described above regarding the method illustrated by FIG. 5 represent only exemplary embodiments and do not represent all possible embodiments.

Figure 6:
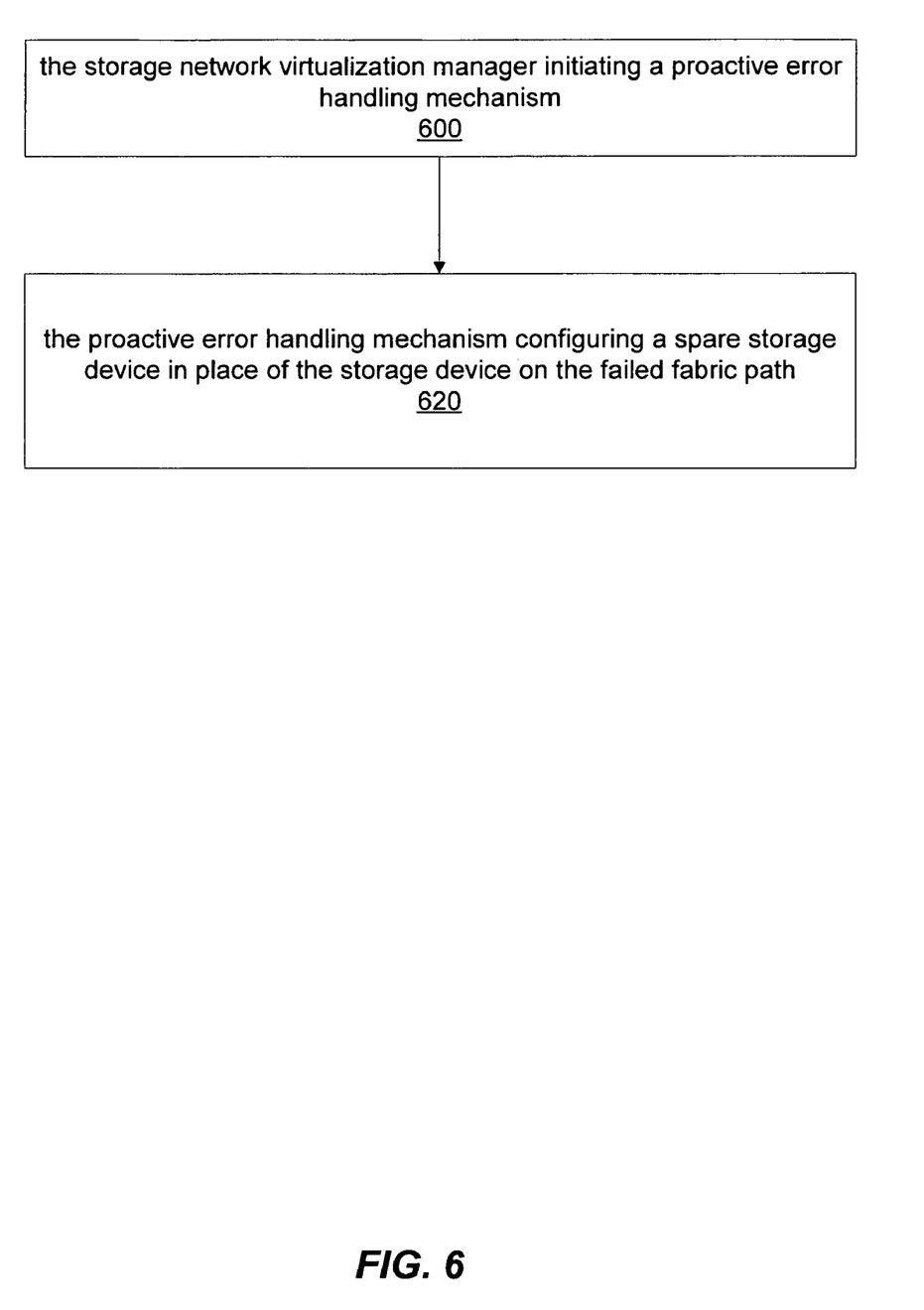
FIG. 6 is a flowchart illustrating one embodiment of a method for proactively utilizing a network fabric event by configuring a spare storage device.

FIG. 6 is a flowchart illustrating one embodiment of a method for proactively utilizing a network fabric event by configuring a spare storage device. In one embodiment, as illustrated by block 600, a storage network virtualization manager may initiate a proactive error handling mechanism. As described above, in one embodiment, storage network virtualization manager 120 may initiate a proactive error handling mechanism in response to network fabric event 210. In one embodiment, the proactive error handling mechanism may configure a spare storage device in place of a storage device on the failed fabric path, as illustrated by block 620. For instance, as illustrated in FIG. 3, storage network virtualization manager 120 may initiate a proactive error handling mechanism in response to network fabric event 210 and the proactive error handling mechanism may configure spare storage device 160 in place of inaccessible storage device 140, according to one embodiment.

The exact manner in which a proactive error handling mechanism may configure a spare storage device may vary from embodiment to embodiment. For instance, in some embodiments, the distributed storage environment may include one or more spare mirrored storage devices and spare storage device 160 may be a redundant mirrored copy of storage device 140. A proactive error handling mechanism may, in such an embodiment, instruct a storage sub-system to use spare storage device 160 in place of storage device 140. In another example, storage devices 140 and 160 may be part of a RAID storage system and a proactive error handling mechanism may instruct the RAID system to remove storage device 140 from the RAID configuration and to use spare storage device 160 in place of storage device 140.

Please note that the specific steps described above represent only one of many possible arrangements of steps to implement the method illustrated by FIG. 6 and that other embodiments may include fewer or additional steps, or may perform the steps in a different order or a different manner than that described above. The specific embodiments described above regarding the method illustrated by FIG. 6 represent only exemplary embodiments and do not represent all possible embodiments.

Figure 7:
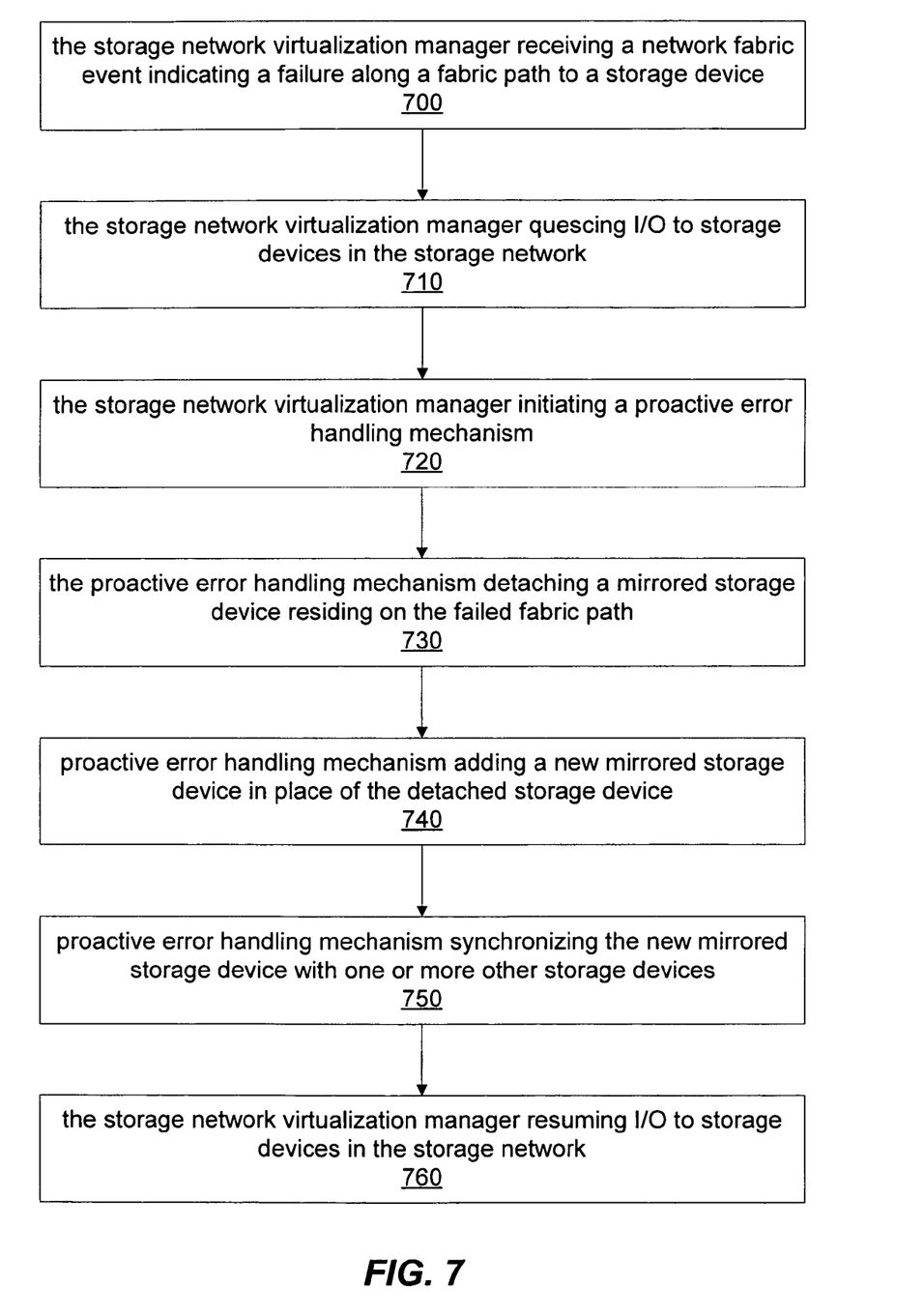
FIG. 7 is a flowchart illustrating one embodiment of a method for minimizing I/O failures by proactively utilizing network fabric events.

FIG. 7 is a flowchart illustrating one embodiment of a method for minimizing I/O failures by proactively utilizing network fabric events. As described above, a storage network virtualization manager may receive a network fabric event indicating a failure along a fabric path to a storage device, as illustrated by block 700. For example, storage network virtualization manager 120 may receive network fabric event 210 indicating a fabric failure along a fabric path to storage device 140, as described above regarding FIG. 3. The storage network virtualization manager may quiesce I/O to storage devices in the storage network, as illustrated by block 710.

In some embodiments, the storage virtualization manager may quiesce I/O only to storage devices residing on the failed fabric path, while in other embodiments, the storage network virtualization manager may quiesce I/O to all storage devices in the same storage network or storage network subsystem that includes the failed fabric path. For example, storage network virtualization manager 120 may quiesce I/O to storage device 140. In another example, storage network virtualization manager 120 may quiesce I/O to both storage devices 140 and 150. In one embodiment, storage network virtualization manager 120 may quiesce I/O to storage device 140 by broadcasting an I/O quiesce request message. However, storage network virtualization manager 120 may quiesce I/O to storage devices in a number of different ways according to different embodiments. The storage network virtualization manager may initiate a proactive error handling mechanism, as described above and illustrated by block 720.

Additionally, in one embodiment, the proactive error handling mechanism may detach a mirrored storage device residing on the failed fabric path, as illustrated by block 730. For example, an error handling mechanism initiated by storage network virtualization manager 120 in response to network fabric event 210 may instruct the storage network to detach storage device 140 and therefore not to attempt to access storage device 140 in the future.

The proactive error handling mechanism may add a new mirrored storage device in place of the detached storage device, as illustrated by block 740 and may also synchronize the new mirrored storage device with one or more other storage devices, as illustrated by block 750. For example, storage device 140 may be a mirrored storage device and a fabric path failure may make storage device 140 inaccessible to the rest of the storage network. In response to receiving network fabric event 210, storage network virtualization manager 120 may initiate a proactive error handling mechanism that may instruct the storage network to detach, or otherwise stop using, storage device 140 and may also instruct the storage network to add and synchronize, or otherwise begin using, a new mirrored storage device, such as spare storage device 160, according to one embodiment.

In another embodiment, rather than instruct other devices or processes of the storage network, the proactive error handling mechanism may be configured to directly configure the storage network to detach storage device 140 and add and synchronize spare storage device 160. For example, the storage devices 140 and 150 may be mirrored copies of a single storage volume, and in response to a network fabric event indicating a fabric path failure prevent access to storage device 140, storage network virtualization manager 120 may initiate a proactive error handling mechanism that may detach storage device 140 and add spare storage device 160 to the storage network. After detaching storage device 140 and adding spare storage device 160, the error handling mechanism may synchronize newly added spare storage device 160 with storage device 150 so that storage devices 150 and 160 may now be mirrored copies of the same storage volume, as an example according to one embodiment. In other embodiments, proactive error handling mechanisms may detach, add, and/or synchronize storage devices in a different order or in a different manner than illustrated by FIG. 7 and described herein.

After the proactive error handling mechanism completes, the storage network virtualization manager may resume I/O to storage devices in the storage network, as illustrated by block 760. For example, storage network virtualization manager 120 may, after a proactive error handling mechanism initiated in response to network fabric event 210 completes, resume I/O to storage devices 150 and 160. In one embodiment, resynchronization of the spare mirror may happen in the background and I/Os may be resumed as soon as the spare mirror is attached as part of the error handling. Storage network virtualization manager 120 may resume I/O to storage devices in any of a number of ways, according to various embodiments. The various methods of quiescing and resuming I/O to storage devices are well known in the art and will not be described in detail herein.

Please note that the specific steps described above represent only one of many possible arrangements of steps to implement the method illustrated by FIG. 7 and that other embodiments may include fewer or additional steps, or may perform the steps in a different order or a different manner than that described above. The specific embodiments described above regarding the method illustrated by FIG. 7 represent only exemplary embodiments and do not represent all possible embodiments.

Figure 8:
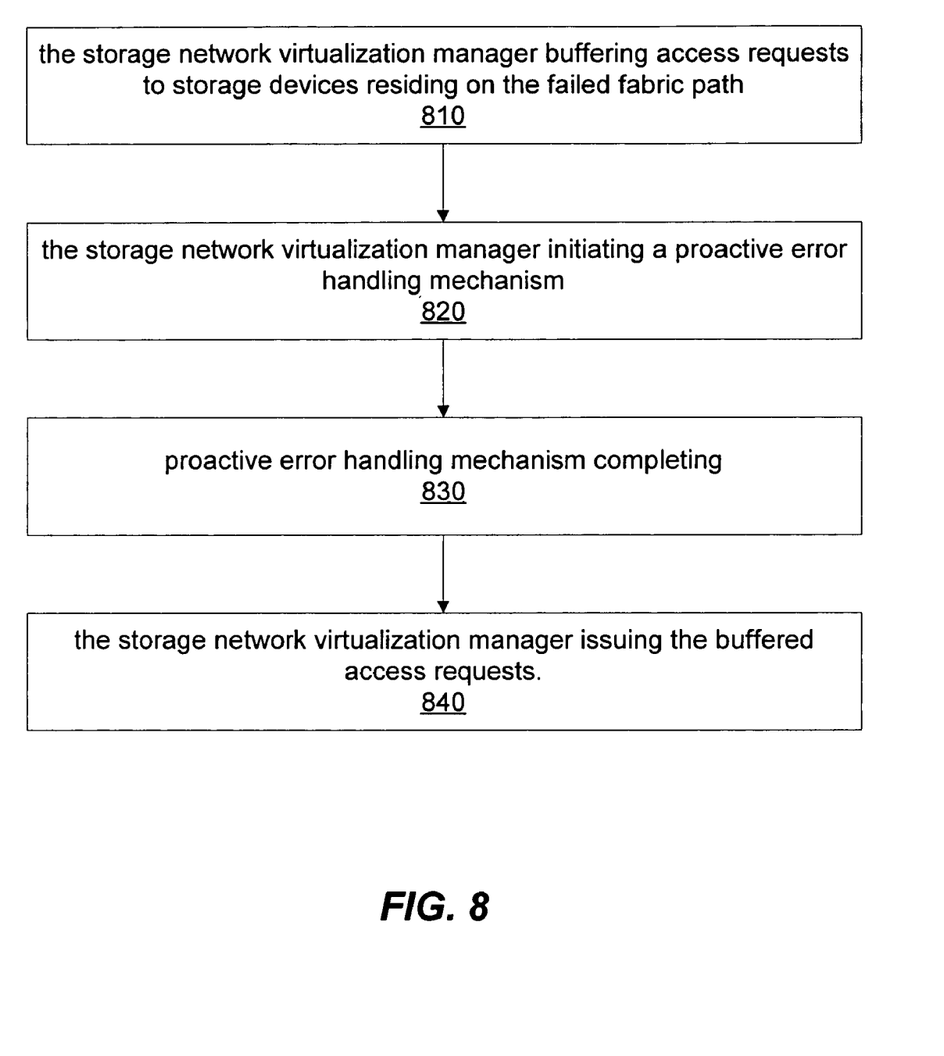
FIG. 8 is a flowchart illustrating one embodiment of a method for minimizing I/O failures by buffering access requests when proactively utilizing network fabric events.

FIG. 8 is a flowchart illustrating one embodiment of a method for minimizing I/O failures by buffering access requests when proactively utilizing network fabric events. A storage network virtualization manager may buffer access requests to storage devices residing on a failed fabric path, according to one embodiment, and as illustrated by block 810. For example, after receiving network fabric event 210, storage network virtualization manager 120 may buffer access requests, perhaps issued by host 110, for storage device 140, in one embodiment. Storage network virtualization manager 120 may buffer access requests itself, in one embodiment, or may instruct another process in the storage network to buffer access requests, in another embodiment. Not only may storage network virtualization manager 120 buffer any currently issued access requests, storage network virtualization manager 120 may continue to buffer any additional access requests issued while the network fabric condition that caused the issuance of network fabric event 210.

Additionally, the storage virtualization network manager may initiate a proactive error handling mechanism, as illustrated by block 820, in one embodiment. As described above, storage network virtualization manager 120 may initiate a proactive error handling mechanism in response to receiving network fabric event 210 and after begin to buffer access requests to storage devices in the storage network. Additionally, storage network virtualization manager 120 may buffer all access requests for storage devices in the storage network while the proactive error handling mechanism is executing.

Once the proactive error handling mechanism completes, as illustrated by block 830, the storage network virtualization manager may, in one embodiment, issue the buffered access requests to the storage devices on the failed fabric path, as illustrated by block 840. For example, after the completion of a proactive error handling mechanism initiated by storage network virtualization manager 120 in response to receiving network fabric event 210, storage network virtualization manager 120 may issue any and all buffered access requests to the relevant storage devices. For instance, storage network virtualization manager 120 may have buffered access requests for storage device 140 and may have initiated a proactive error handling mechanism that determined and applied an alternate fabric path to storage device 140. After the proactive error handling mechanism completes, storage network virtualization manager 120 may then issue the buffered access requests to storage device 140, in one embodiment. In another embodiment, the proactive error handling mechanism may have detached storage device 140 may have configured spare storage device 160 in place of storage device 140. Storage network virtualization manager 120 may, in such an embodiment, issue the buffered access requests to storage device 160 that may be in place of detached storage device 140.

Please note that the specific steps described above represent only one of many possible arrangements of steps to implement the method illustrated by FIG. 8 and that other embodiments may include fewer or additional steps, or may perform the steps in a different order or a different manner than that described above. The specific embodiments described above regarding the method illustrated by FIG. 8 represent only exemplary embodiments and do not represent all possible embodiments.

Figure 9:
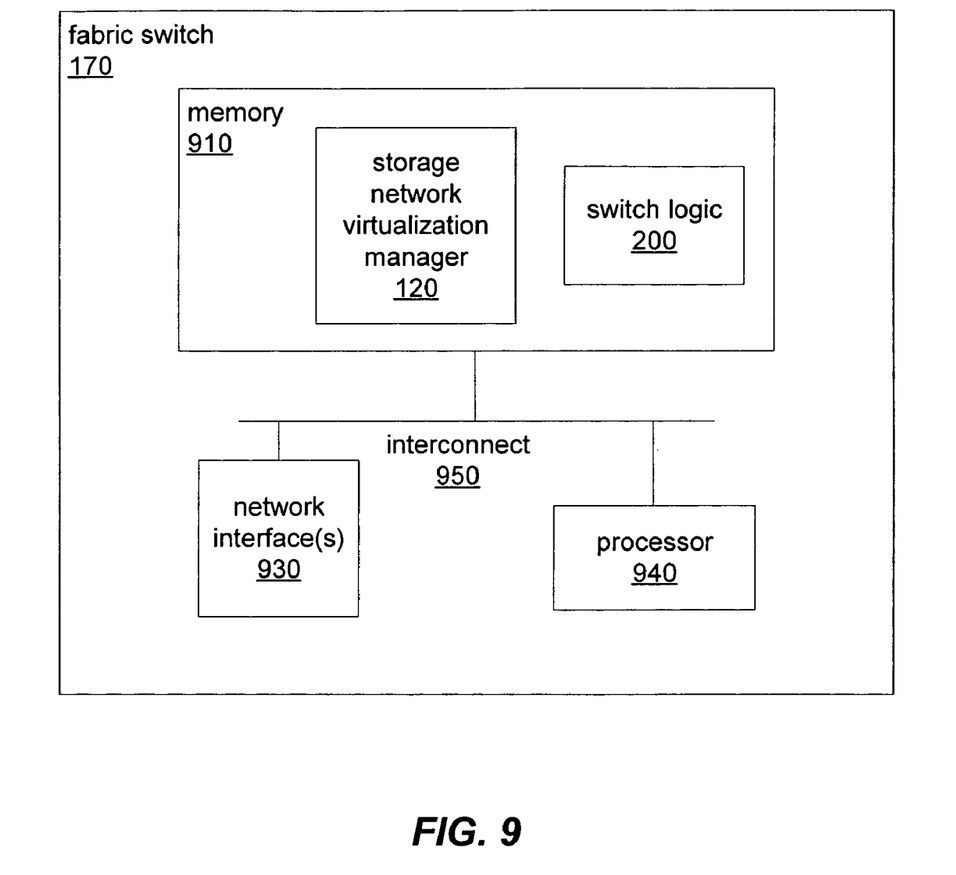
FIG. 9 is a block diagram illustrating an exemplary computer system suitable for proactively utilizing network fabric events, according to one embodiment.

FIG. 9 is a block diagram illustrating an exemplary computer system capable of proactively utilizing network fabric events, as described herein and according to various embodiments. Fabric switch 170 may be any of various types of devices, including, but not limited to, a personal computer system, desktop computer, laptop or notebook computer, mainframe computer system, handheld computer, workstation, network computer, any type of networkable peripheral device such as storage devices, switches, modems, routers, etc, or in general any type of networkable computing device. Fabric switch 170 may include at least one processor 940. Processor 940 may couple across interconnect 950 to memory 910 and network interface(s) 930. Network interfaces 930 may be any of various types of interfaces configured to couple with and communicate with other devices, according to various embodiments. In one embodiment network interfaces 930 may represent a network interface configured to couple with and communicate over network 100 illustrated in FIG. 1 and described above.

Memory 910 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 910 may include program instructions configured to implement a storage network virtualization manager, such as storage network virtualization manager 120, as described above. In certain embodiments memory 910 may include program instructions configured to implement switch logic configured to detect and remote changes in a network fabric, such as switch logic 200, described above. In one embodiment, memory 910 may include instruction configured to implement both storage network virtualization manager 120 and switch logic 200.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
   a storage network virtualization manager, implemented on one or more devices on a storage network comprising a network fabric, receiving a network fabric event indicating a problem on a network path of the network fabric, wherein the storage network virtualization manager is configured to present a logical aggregated representation of data stored on one or more storage devices of the storage network to one or more host devices of the storage network via the network fabric, and wherein the network path links at least one of the host devices to one of the storage devices; and
   the storage network virtualization manager initiating correction of the problem on the network path indicated by the network fabric event, wherein said correction of the problem on the network path is initiated and completed without failure of any access requests from the at least one of the host devices to the storage device on the network path due to the problem on the network path indicated by the network fabric event.

2. The method of claim 1, wherein the problem on the network path is due to the network path failing, and wherein said correction of the problem on the network path comprises:
   determining an alternate network path from the at least one of the host devices to the storage device; and
   replacing the failed network path with the alternate network path.

3. The method of claim 1, wherein the received event comprises a state change notification event of a fabric device API.

4. The method of claim 1, wherein the problem on the network path is due to the storage device failing, and wherein said correction of the problem on the network path comprises configuring a spare storage device in place of the failed storage device.

5. The method of claim 1, further comprising:
   the storage network virtualization manager managing mirroring of a plurality of mirrored storage devices including the storage device, wherein the problem on the network path prevents access to the storage device; and
   wherein said correction of the problem on the network path comprises detaching the inaccessible mirrored storage device.

6. The method of claim 5, wherein said correction of the problem on the network path comprises:
   adding a new mirrored storage device to the plurality of mirrored storage devices, wherein the new mirrored storage device is accessible through a network path separate from the network path indicated by the network fabric event; and
   synchronizing the new mirrored storage device with one or more of the plurality of mirrored storage devices.

7. The method of claim 1, wherein said correction of the problem on the network path comprises completing correction of the network path problem before the storage network virtualization manager receives an I/O request for the storage device on the network path indicated by the network fabric event.

8. The method of claim 1, wherein said correction of the problem on the network path comprises:
   determining that the problem on the network path affects one or more additional storage devices associated with the network path; and
   correcting the problem on the network path for the additional storage devices.

9. The method of claim 1, further comprising:
   the storage network virtualization manager quiescing access requests for the storage device prior to said initiating; and
   the storage network virtualization manager, in response to the completion of the network path problem correction, resuming access requests for the storage device.

10. The method of claim 1, further comprising the correction of the problem on the network path completing prior to any host device issuing an access request to the storage device over the network path indicated by the network fabric event.

11. The method of claim 1, further comprising:
    the storage network virtualization manager buffering access requests for the storage device prior to said initiating; and
    the storage network virtualization manager, in response to the completion of the network path problem correction, issuing the buffered access requests to the storage device.

12. The method of claim 11, further comprising the storage network virtualization manager issuing access requests for the storage device prior to a timeout failure of any of the buffered access requests for the storage device.

13. The method of claim 1, wherein said correction of the problem on the network path comprises sending the network fabric event to another virtualization manager for the storage network.

14. The method of claim 1, further comprising:
    the storage network virtualization manager managing a plurality of mirrored storage devices;
    replacing one of the plurality of mirrored storage devices with a new mirrored storage device, wherein the network fabric event indicating a problem on a network path corresponds to said replacing; and
    wherein said correction of the problem on the network path comprises synchronizing the new mirrored storage device with one or more others of the plurality of mirrored storage devices.

15. A storage network, comprising:
    a network fabric comprising a plurality of fabric devices;
    a plurality of storage devices;
    a plurality of host devices; and
    a storage network virtualization manager implemented on one or more of the plurality of fabric devices and configured to present a logical aggregated representation of data stored on the storage devices to the host devices via the network fabric;

wherein the storage network virtualization manager is configured to:

receive a network fabric event indicating a problem on a network path of the network fabric, wherein the network path links at least one of the host devices to one of the storage devices; and initiate correction of the problem on the network path indicated by the network fabric event, wherein said correction of the problem on the network path is initiated and completed without failure of any access requests from the at least one of the host devices to the storage device on the network path due to the problem on the network path indicated by the network fabric event.

16. The system of claim 15, wherein the system further comprises an error handling mechanism implemented on the network fabric, wherein said correction of the problem on the network path is performed by the error handling mechanism, and wherein, in said correction of the problem on the network path, the error handling mechanism is configured to:

determine an alternate path to the storage device; and apply the alternate network path to the storage device.

17. The system of claim 15, wherein the storage network virtualization manager is configured to manage the mirroring of a plurality of mirrored storage devices including the storage device, wherein the problem on the network path prevents access to the storage device, and wherein the system further comprises an error handling mechanism implemented on the network fabric, wherein said correction of the problem on the network path is performed by the error handling mechanism, and wherein, in said correction of the problem on the network path, the error handling mechanism is configured to detach the inaccessible mirrored storage device.

18. The system of claim 17, wherein the error handling mechanism is further configured to:

add a new mirrored storage device to the plurality of mirrored storage devices, wherein the new mirrored storage device is accessible through a different network path than the network path indicated by the network fabric; and synchronize the new mirrored storage device with one or more other of the plurality of mirrored storage devices.

19. The system of claim 15, wherein the storage network virtualization manager is further configured to:

buffer access requests for the storage device prior to said initiating; and in response to the completion of the network path problem correction, issue the buffered access requests to the storage device.

20. A computer-readable storage medium, comprising program instructions configured to implement:

a storage network virtualization manager receiving a network fabric event indicating a problem on a network path of the network fabric, wherein the storage network virtualization manager is configured to present a logical aggregated representation of data stored on one or more storage devices of the storage network to one or more host devices of the storage network via the network fabric, and wherein the network path links at least one of the host devices to one of the storage devices; and the storage network virtualization manager initiating correction of the problem on the network path indicated by the network fabric event, wherein said correction of the problem on the network path is initiated and completed without failure of any access requests from the at least one host devices to the storage device on the network path due to the problem on the network path indicated by the network fabric event.

* * * * *